United States Patent
Clifton et al.

(10) Patent No.: US 11,537,136 B2
(45) Date of Patent: Dec. 27, 2022

(54) EVENT-BASED IMAGE CAPTURING FOR A REFUSE VEHICLE

(71) Applicant: Oshkosh Corporation, Oshkosh, WI (US)

(72) Inventors: Cody Clifton, Mapleton, MN (US); Jeffrey Koga, Oshkosh, WI (US); Josh Rocholl, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 133 days.

(21) Appl. No.: 16/851,163

(22) Filed: Apr. 17, 2020

(65) Prior Publication Data

US 2020/0348681 A1    Nov. 5, 2020

Related U.S. Application Data

(60) Provisional application No. 62/841,004, filed on Apr. 30, 2019.

(51) Int. Cl.
*B60P 1/48* (2006.01)
*G05D 1/02* (2020.01)
(Continued)

(52) U.S. Cl.
CPC .............. *G05D 1/0231* (2013.01); *B60P 1/48* (2013.01); *G01S 19/421* (2013.01);
(Continued)

(58) Field of Classification Search
CPC ............... G05D 1/0231; G05D 1/0094; G05D 2201/0207; B60P 1/48; G01S 19/421; G06K 9/00791; H04N 5/2253
See application file for complete search history.

(56) References Cited

U.S. PATENT DOCUMENTS 6,266,598 B1    7/2001 Pillar et al.
6,421,593 B1    7/2002 Kempen et al.
(Continued)

FOREIGN PATENT DOCUMENTS

WO    WO-2004/094269 A1    11/2004
WO    WO-2017/173381 A1    10/2017

OTHER PUBLICATIONS

International Search Report and Written Opinion regarding Application No. PCT/US2020/029229 dated Sep. 7, 2020, 15 pps.

*Primary Examiner* — Mathew Franklin Gordon
(74) *Attorney, Agent, or Firm* — Foley & Lardner LLP

(57) ABSTRACT

A refuse vehicle includes a chassis supporting a plurality of wheels and a vehicle body. The vehicle body defines a receptacle for storing refuse. A lifting system is movable between a first position and a second position vertically offset from the first position. A processing unit is in communication with a sensor. An imaging device is in communication with the processing unit and is positioned on the refuse vehicle to have a field of view extending outwardly away from the refuse vehicle. The processing unit controls the imaging device to capture an image upon receiving an indication, from the sensor, that an indicator is present within the field of view. In some embodiments, the indicator is the presence of a positive object, like a waste container. In other embodiments, the indicator is the omission of an object (e.g., no container is detected) within the field of view.

20 Claims, 3 Drawing Sheets

(51) Int. Cl.
  *H04N 5/225*  (2006.01)
  *G01S 19/42*  (2010.01)
  *G05D 1/00*   (2006.01)
  *G06V 20/56*  (2022.01)

(52) U.S. Cl.
  CPC ............ *G05D 1/0094* (2013.01); *G06V 20/56* (2022.01); *H04N 5/2253* (2013.01); *G05D 2201/0207* (2013.01)

(56) References Cited

U.S. PATENT DOCUMENTS

| | | |
|---|---|---|
| 6,553,290 B1 | 4/2003 | Pillar |
| 6,757,597 B2 | 6/2004 | Yakes et al. |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,392,122 B2 | 6/2008 | Pillar et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,756,621 B2 | 7/2010 | Pillar et al. |
| 7,831,363 B2 | 11/2010 | Quigley |
| 8,095,247 B2 | 1/2012 | Pillar et al. |
| 9,062,983 B2 | 6/2015 | Zych |
| 10,414,067 B2 | 9/2019 | Datema et al. |
| 10,414,385 B2 | 9/2019 | Linsmeier et al. |
| 2018/0250847 A1 | 9/2018 | Wurtz et al. |
| 2019/0087790 A1* | 3/2019 | Flood ..................... G07C 5/02 |
| 2019/0091890 A1 | 3/2019 | Rocholl et al. |
| 2019/0121353 A1 | 4/2019 | Datema et al. |
| 2019/0193934 A1 | 6/2019 | Rocholl et al. |
| 2019/0291711 A1 | 9/2019 | Shukla et al. |
| 2019/0325220 A1 | 10/2019 | Wildgrube et al. |
| 2019/0385384 A1* | 12/2019 | Romano ................ G06Q 10/08 |
| 2020/0078986 A1 | 3/2020 | Clifton et al. |

\* cited by examiner

EVENT-BASED IMAGE CAPTURING FOR A REFUSE VEHICLE

CROSS-REFERENCE TO RELATED APPLICATION

This application claims priority to U.S. Provisional Patent Application No. 62/841,004, filed Apr. 30, 2019, the content of which is hereby incorporated by reference in its entirety.

BACKGROUND

Refuse vehicles are often used to pick up and remove waste from customers' property. To promote efficiency, refuse vehicles operate on scheduled waste removal days, where each vehicle can collect waste from several locations along a route. Customers position waste containers in some predetermined and accessible location on their property (or onto the nearby street or sidewalk) so that the contents of the waste containers can be readily transferred into the refuse vehicle. If a waste container is not placed in an accessible location, the refuse vehicle may not remove or haul the waste in the waste container away from the property.

SUMMARY

One exemplary embodiment relates to a refuse vehicle. The refuse vehicle includes a chassis supporting a plurality of wheels. A vehicle body is also supported by the chassis and defines a receptacle for storing refuse. A lifting system is movable between a first position and a second position vertically offset from the first position. A processing unit is in communication with a sensor. An imaging device is in communication with the processing unit and is positioned on the refuse vehicle to have a field of view extending outwardly away from the refuse vehicle. The processing unit controls the imaging device to capture an image upon receiving an indication, from the sensor, that an indicator is present within the field of view. In some embodiments, the indicator is the presence of a positive object, like a waste container. In other embodiments, the indicator is the omission of an object (e.g., no container is detected) within the field of view.

Another exemplary embodiment relates to a method of controlling a refuse vehicle. The method includes sensing, with a sensor, objects within a sensor field of view to detect an indicator within the sensor field of view. The sensor is coupled to the refuse vehicle. The method further includes communicating information from the sensor, including the indicator sensed within the sensor field of view, to a processing unit in communication with the sensor. The method further includes capturing, with an imaging device, media of an imaging device field of view upon receiving confirmation that the indicator is located within the sensor field of view from the processing unit. The sensor field of view and the imaging device field of view at least partially overlap.

Another exemplary embodiment relates to a refuse vehicle. The refuse vehicle includes a chassis supporting a plurality of wheels. A vehicle body is also supported by the chassis and defines a receptacle for storing refuse. A lifting system is movable between a first position and a second position vertically offset from the first position. A processing unit is in communication with a global positioning system and a clock. An imaging device is in communication with the processing unit and is positioned on the refuse vehicle to have a field of view extending outwardly away from the refuse vehicle. The processing unit controls the imaging device to capture media upon receiving a prompt that an indicator is present within the field of view and then directs a memory to store the captured media with a current refuse vehicle location generated by the global positioning system and a timestamp generated by the clock.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for operating and controlling a refuse vehicle. Refuse vehicles are used to pick up refuse at multiple locations during a single trip. Events may occur along the trip that could be recorded to aid in future decision-making processes. For example, customers along a garbage or recycling route may forget to put out waste containers prior to the refuse vehicle traversing a scheduled waste pick-up route. Documenting and imaging the missing waste container, along with the timing and location where the can was missing, would provide evidence that proper protocols were followed and limit the amount of potentially costly follow-up service required by each refuse vehicle. The refuse vehicle or a central network computer could then provide a notification to a customer associated with an address where no waste container was detected and waste collection service was not performed. The refuse vehicle could return at a later time to perform waste collection upon receipt of confirmation that the waste container is properly positioned for pickup, which could be done for additional cost.

Figure 1:
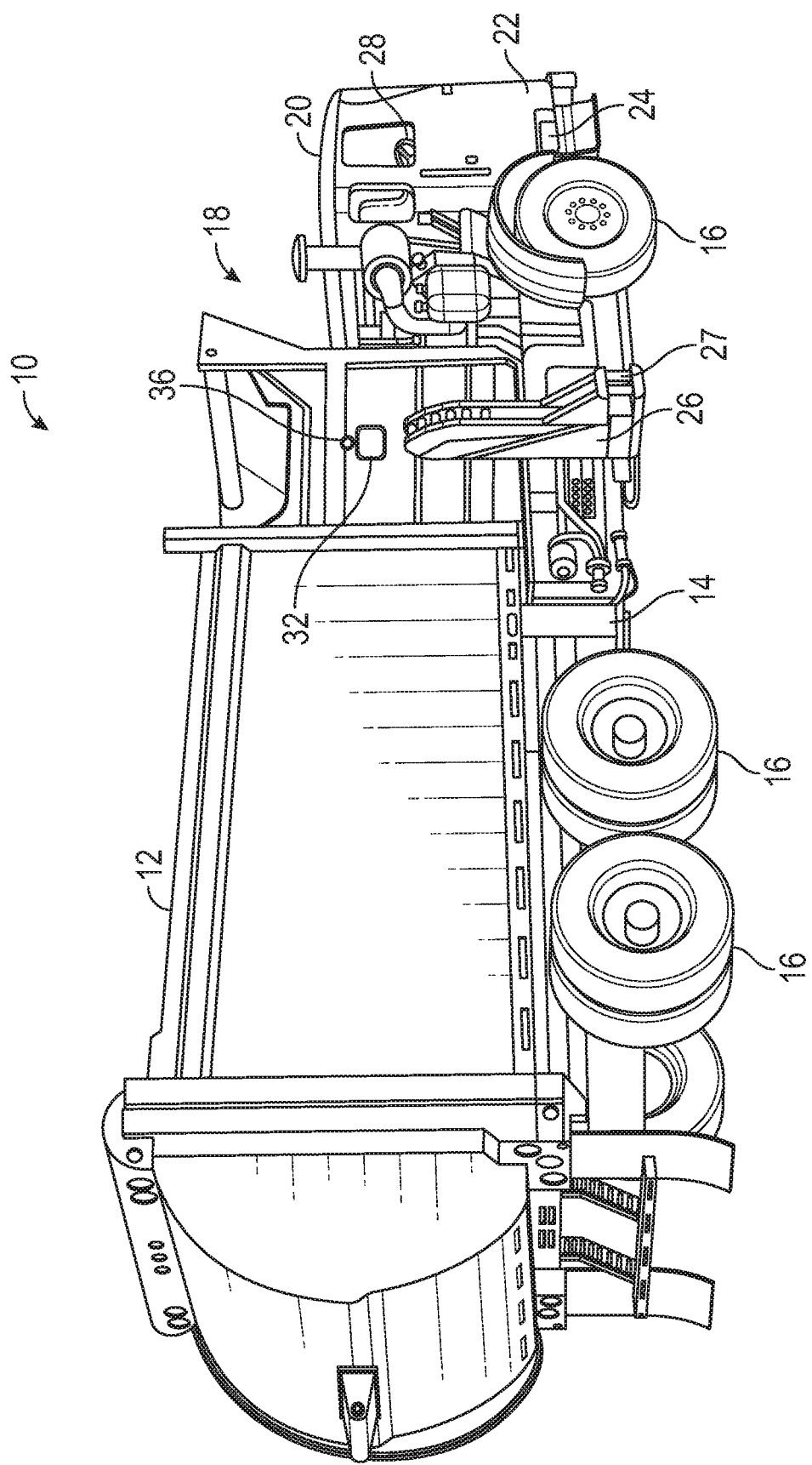
FIG. 1 is a perspective view of a refuse vehicle, according to an exemplary embodiment.

As shown in FIG. 1, a refuse vehicle 10 is adapted for retrieving and hauling refuse from waste containers. The refuse vehicle 10 can be a front end loader, rear end loader, or side loader 10, for example, that is arranged to lift and transfer contents of a waste container into an on-board receptacle 12. The refuse vehicle 10 has a vehicle chassis 14 that generally supports wheels 16, a vehicle body 18, and the receptacle 12. The vehicle body 18 can include a cab 20 and a motor housing 22 that receives a motor 24. The motor 24 produces rotational power that is transmitted to the wheels 16 to drive the refuse vehicle 10.

The on-board receptacle 12 is sized to receive the contents of multiple waste containers so that the refuse vehicle 10 can execute an extended route that may include several stops. Upon arriving at each site, a lifting system 26 (e.g., a hydraulic arm assembly, can tipper assembly, grabber arm assembly) can engage and raise a waste container until it is inverted or angled downward toward the on-board receptacle 12. Aided by gravity, waste falls out of the container into the on-board receptacle 12. The waste container can then be lowered to the ground and disengaged from the lifting mechanism 26 so that the refuse vehicle 10 can drive to another location along its route and repeat the waste removal process.

Figure 2:
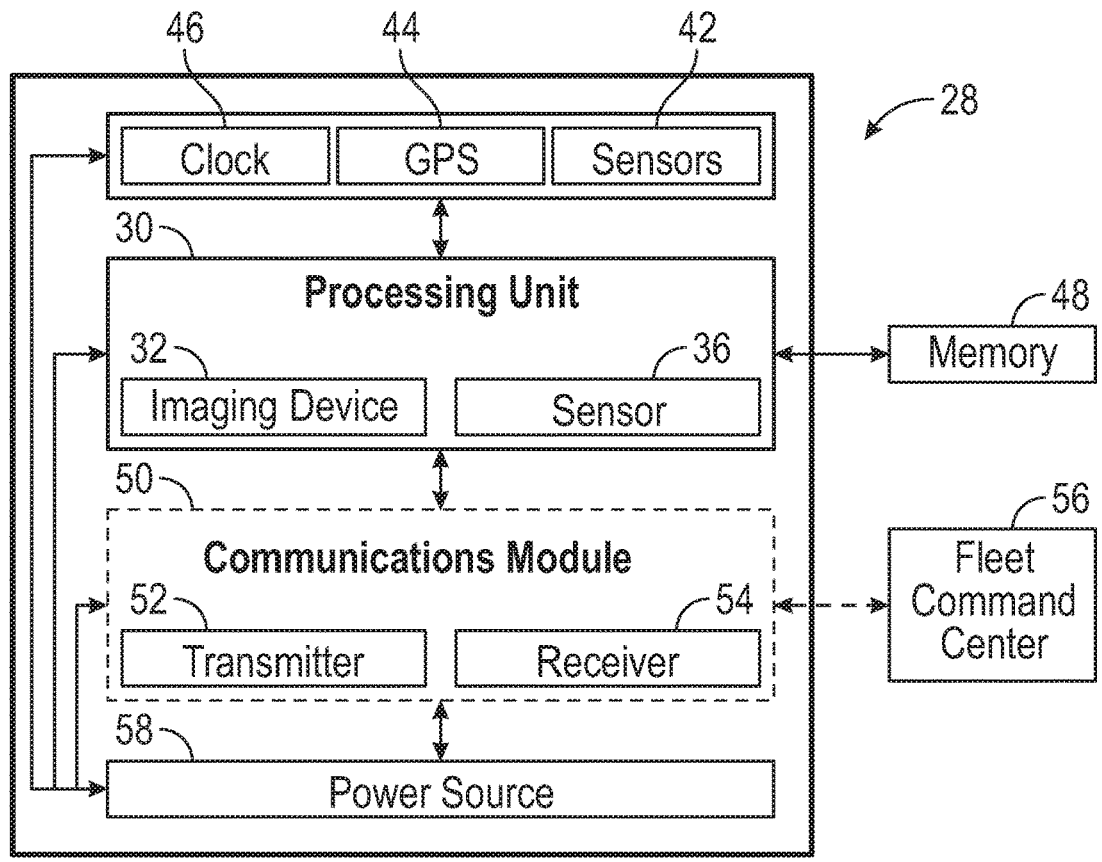
FIG. 2 is a schematic diagram of components that can be incorporated into the refuse vehicle of FIG. 1.

With additional reference to FIG. 2, the refuse vehicle 10 can include a control system 28. The control system 28 can aid a driver in performing different vehicle tasks. The control system 28 can provide operating instructions to various vehicle subsystems, including a steering system, the lifting system 26, a waste compactor (not shown) present within the on-board receptacle 12, the motor 24, cab climate controls, and/or other adjustable systems aboard the refuse vehicle 10. A processing unit 30 can issue instructions or commands to each system within the vehicle 10 to execute desired vehicle functions.

The control system 28 can also be used to monitor and collect information about the refuse vehicle 10 as it performs a waste collection route. For example, the refuse vehicle 10 includes an imaging device 32 that is used to capture images or videos of vehicle surroundings and environment as the refuse vehicle 10 operates. The imaging device 32 can be a still-frame camera or video camera, for example, which can record events or data within an imaging device field of view 34 (shown in FIGS. 4 and 5). The imaging device 32 can be located on the vehicle body 18, lifting system 26, or some other location on the vehicle so that the imaging device field of view 34 extends at least partially outwardly away from the refuse vehicle 10. In some embodiments, the imaging device 32 is located on a lifting arm 27 of the lifting system 26.

Figure 4:
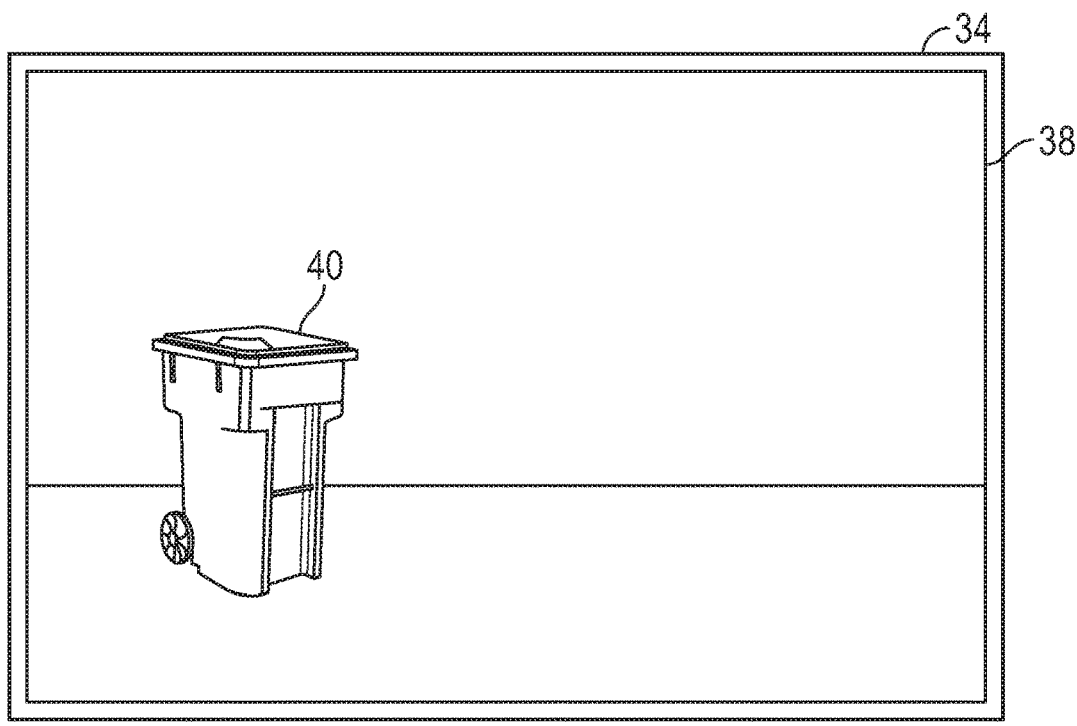
FIG. 4 is a pictorial view of an area sensor field of view and an imaging device field of view performing the method of FIG. 3.
Figure 5:
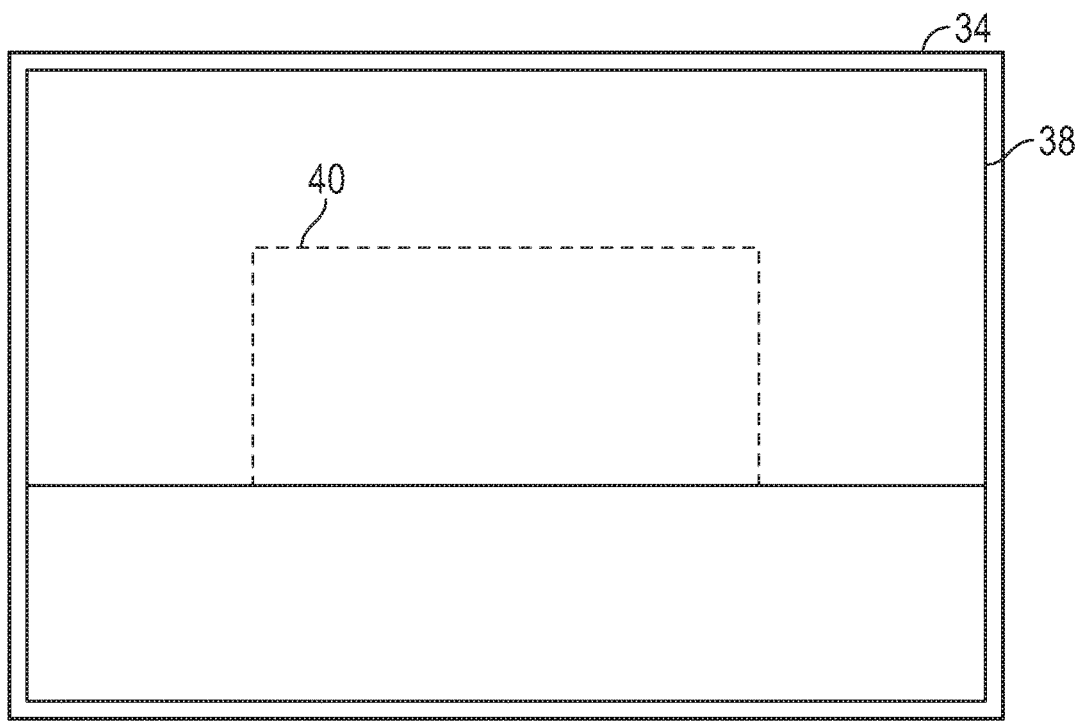
FIG. 5 is a pictorial view of an area sensor field of view and an imaging device field of view performing a variation of the method of FIG. 3.

The imaging device 32 can be in communication with a sensor 36 (e.g., an area sensor) that monitors the surroundings of the refuse vehicle 10 during operation. As shown in FIGS. 4 and 5, the area sensor 36 can actively monitor an area sensor field of view 38 for the presence of an indicator 40, like a waste container. If the area sensor 36 determines that an indicator 40 is present within the area sensor field of view 38, the area sensor 36 can provide an indication to the processing unit 30. The processing unit 30 can then, upon receiving confirmation that an indicator 40 is present within the area sensor field of view 38, issue a command to the imaging device 32 to capture an image or video that corresponds with the imaging device field of view 34. Because the imaging device field of view 34 at least partially overlaps the area sensor field of view 38, the image or video captured by the imaging device should include the indicator 40.

When the imaging device 32 captures an image or video of the indicator 40, the processing unit 30 can prompt other sensors 42 to provide additional data related to the event. For example, a coordinate monitoring system can be used to detect and determine a location of the refuse vehicle 10 when the imaging device 32 was activated. A global positioning system (GPS) 44 can provide a specific coordinate or address where the imaging device 32 was operated in order to later identify a customer associated with the detected address. In some embodiments, a clock 46 is provided within the control system 28 as well. The clock 46 can provide a time stamp for when the imaging device 32 operated (i.e., captured and/or recorded media), which can then be assigned to the particular piece of recorded media (i.e., image(s) or video). Data from the GPS 44 and clock 46 can be provided to the processing unit 30, which can then group the captured media and informational data together and store each piece of information as an event on a memory 48. The memory 48 can be local or remote memory in communication with the processing unit 30. For example, cloud-based or network-based memory devices can be used, as well as on-board random access memory (RAM) and/or a hard drive or flash drive.

In some embodiments, the control system 28 further includes a communications module 50 to send and receive information between a network of other devices. For example, the communications module 50 can include a transmitter 52. The transmitter 52 can be arranged to receive information, like the detection of an indicator 40 within the area sensor region of interest 38, from the processing unit 30 and send a signal that includes information related to the event to an external computing device, like a fleet command center 56 or network computer. In some embodiments, the transmitter 52 issues a signal containing the time, address, and media associated with the event each time the imaging device 32 operates to capture and record media. The communications module 50 can further include a receiver 54 to receive instructions from an external source, like the fleet command center 56. In some examples, the imaging device 32 captures media and sends the media, through the transmitter 52, to an external computing device having an image analyzer (not shown). The image analyzer can determine whether or not an indicator 40 is present within the transmitted media, and then issue a return signal to the receiver 54 on the communications module 50. The return signal could include a determination of whether or not the indicator 40 is present within the transmitted media, and could prompt the processing unit 30 to acquire time and address data from the clock 46 and GPS 44, respectively, which can then be returned to the external computing device through the transmitter 52 and stored remotely from the work vehicle 10. Each item in the control system 28 can be supplied with power from a power source 58, like a battery or a motor.

Figure 3:
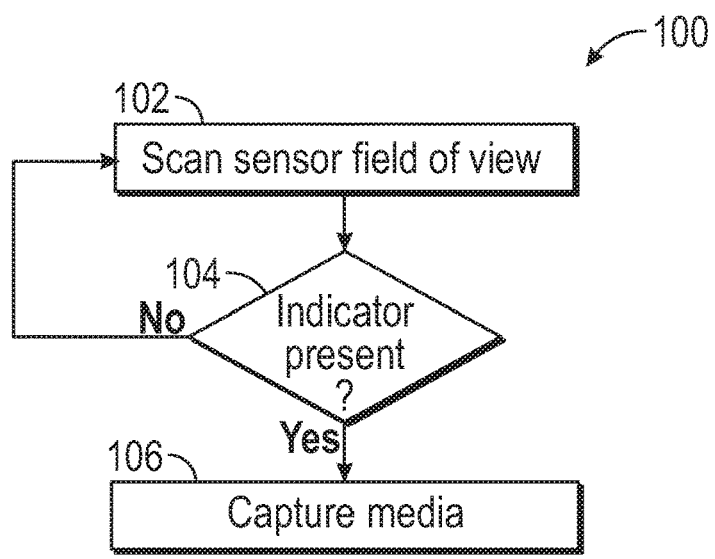
FIG. 3 is a process diagram of a method for controlling a refuse vehicle, according to an exemplary embodiment.

FIGS. 3-5 detail a method of controlling a refuse vehicle 100 that can be performed using the control system 28 and refuse vehicle 10, described above. At step 102, an area sensor (e.g., area sensor 36) scans an area sensor field of view 38. As shown in FIGS. 4 and 5, the area sensor field of view 38 can be aligned with a location where a waste container may normally be present along a route. Accordingly, the area sensor may be positioned along a side of the refuse vehicle body 18, in front of the refuse vehicle 10, or behind the refuse vehicle 10, depending upon the loading mechanism (e.g., front load, side load, rear load) used on the refuse vehicle 10. The area sensor 36 may be arranged so that the area sensor field of view 38 is directed approximately perpendicular to the surface of the refuse vehicle 10 that the area sensor 36 is mounted on. Alternatively, the area sensor 36 can be arranged so that the area sensor field of view 38 is approximately parallel to the surface of the refuse vehicle 10 that the area sensor 36 is mounted on. Although shown two-dimensionally, the area sensor field of view 38 can take a conical shape that widens as the area sensor field of view 38 extends away from the area sensor 36, for example.

The sampling rate of the area sensor 36 can be controlled manually or automatically to scan the area sensor field of view 38 for the presence of an indicator 40. In some embodiments, the processing unit 30 monitors the operation of the refuse vehicle 10, and issues a command to the area sensor 36 based upon detected vehicle parameters. For example, the processing unit 30 may be designed to issue a command to the area sensor 36 to scan the area sensor field of view 38 whenever the vehicle transitions between drive and park (e.g., which would indicate that a stop along a route was occurring). In other embodiments, the processing unit 30 actively monitors the current location of the refuse vehicle 10 using the GPS 44. The address of each customer can be stored within the memory 48, and the processing unit 30 can be actively comparing the current location of the refuse vehicle 10 to the stored customer addresses within the memory 48. Whenever the current location of the refuse vehicle 10 matches a stored address of a customer, the processing unit 30 can issue a command to the area sensor 36 to perform step 102, and scan the area sensor field of view 38 for an indicator 40. In still other embodiments, an operator within the refuse vehicle 10 can input a command to the processing unit 30 and the area sensor 36 to operate. Inputs within the cab 20 of the refuse vehicle 10 can be provided to allow the user to initiate the scanning of an area that merits further investigation from the area sensor 36 or imaging device 32.

At decision block 104, the area sensor 36 determines whether or not an indicator 40 is present within the area sensor field of view 38. The indicator 40 can be both positive or negative items. For example, and as shown in FIG. 4, the indicator 40 could be one or more waste containers. In some embodiments, the indicator 40 could be the presence of non-compliant waste containers. Customers along waste removal routes typically have a standardized waste receptacle (e.g., a designated garbage bin and/or a designated recycling bin) that is specifically adapted for use with the refuse vehicle 10. In some situations, a customer may attempt to use alternative receptacles (e.g., bags, smaller or larger cans, etc.) that are not sized or otherwise compatible to operate with the lifting system 26. These alternative receptacles may require an operator to leave the refuse vehicle 10 to perform manual labor that would otherwise not be required and which may increase the amount of time spent on a jobsite. Extra manual labor may not be included within the typical costs of waste removal service, and should be accounted for and recorded. In some embodiments, the indicator 40 can be non-compliant trash or recycling. For example, electronics or paint cans requiring specific disposal methods may be included within the types of things monitored by the area sensor 36. Non-desirable objects, like recycling within garbage containers, human waste or remains, or other contaminants can serve as indicators 40 as well, and can be detected by the area sensor 36. Other possible indicators 40 may be over-filled, contaminated, or tipped-over waste containers. The same area sensor 36 may scan for and detect one or more of the possible indicators 40 discussed.

In other embodiments, and as shown in FIG. 5, the indicator 40 is a negative object (i.e., lack of something) within the area sensor field of view 38. For example, the indicator 40 can be the lack of a waste container within the area sensor field of view. When the refuse vehicle 10 arrives at an address associated with a customer, the area sensor 36 can continue scanning the area sensor field of view 38 for the presence of a waste container. If no waste container is sensed by the area sensor 36 throughout a period of time as the refuse vehicle 10 traverses the address, the area sensor 36 can communicate with the processing unit 30 that an indicator 40 (i.e., no waste container) was present upon the premises.

When the one or more indicators 40 are detected within the area sensor field of view 38, the area sensor 36 communicates with the processing unit 30, which then issues a command to the imaging device 32. At step 106, the imaging device 32 can then record or otherwise capture media (e.g., video(s) or image(s)) of the imaging device field of view 34. Because the imaging device field of view 34 at least partially overlaps with the area sensor field of view 38, media taken by the imaging device 32 should capture the indicator 40.

After or during step 106, the processing unit 30 can communicate with one or more sensors 42 on the refuse vehicle 10 to take additional data related to the event. For example, the GPS 44 and clock 46 can supply an exact location and a time stamp for when the area sensor 36 detected the presence of the indicator 40 within the area sensor field of view 38, and the time in which the event occurred. Each of these pieces of information can then be associated with the captured media and stored within the memory 48, where they may be accessed at a later time. The communications module 50 on board the refuse vehicle 10 may then communicate information associated with the event to an external computing source, like a main office or fleet command center 56, where the information can be further processed or used to archive the event.

The method 100 can include further steps of alerting customers when an indicator 40 was identified at the address associated with their account. For example, the processing unit 30 could issue a notification (e.g., an email or a text message) explaining that no waste container was found on their premises that day. In some embodiments, the notification may provide an option to the customer to arrange for supplemental pick-up service, which could be offered at an additional cost. The media could also be used to provide evidence in case a customer calls to dispute whether or not the waste container was properly accessible on the day of the waste removal route.

A customer could also be alerted that a non-compliant receptacle was found on the premises, and could be alerted that additional manual labor was required at the customer's address or that items were not removed from the waste containers due to defects. The customer could then be charged for an additional cost associated with the extra labor time (which could be recorded automatically by the clock, manually, or otherwise) needed to remove the waste from the non-compliant receptacles, or asked to accept additional charges related to a supplemental route needed to collect the non-compliant materials later.

Using the foregoing systems and methods for operating a refuse vehicle, significant cost savings can be achieved. Customer disputes about whether or not waste containers were properly placed at pickup locations could be readily dispelled while costly additional and non-revenue producing trips could be reduced or eliminated. Compliance with regulations related to acceptable waste materials and waste container capacity would be improved, as rules could be more easily enforced. The automated nature of the process 100 also reduces the amount of manual record keeping that needs to occur on a daily basis, which reduces the amount of distractions an operator has, thereby improving efficiency and saving money.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:
   a chassis supporting a plurality of wheels;
   a vehicle body supported by the chassis and defining a receptacle for storing refuse therein;
   a lifting system movable between a first position and a second position vertically offset from the first position;
   a processing unit in communication with a sensor; and
   an imaging device in communication with the processing unit and positioned on the refuse vehicle to have a field of view extending outwardly away from the refuse vehicle, the processing unit controlling the imaging device to capture an image upon receiving an indication from the sensor that an indicator external to the refuse vehicle is present within the field of view.

2. The refuse vehicle of claim 1, wherein the indicator present within the field of view is a waste container.

3. The refuse vehicle of claim 1, wherein the indicator present within the field of view is an omission of a waste container.

4. The refuse vehicle of claim 1, further comprising a global positioning system in communication with the processing unit, the global positioning system monitoring a current location of the refuse vehicle and supplying coordinates corresponding to the current location of the refuse vehicle to the processing unit upon receiving an indication from the sensor that an indicator is present within the field of view.

5. The refuse vehicle of claim 4, wherein the processing unit is further configured to associate and store the current location of the refuse vehicle with the image captured by the imaging device at the current location of the refuse vehicle upon receiving the indication from the sensor that the indicator is present within the field of view.

6. The refuse vehicle of claim 5, further comprising a clock in communication with the processing unit, wherein the clock supplies a timestamp corresponding to a time in which the sensor detected that the indicator was present within the field of view, and wherein the timestamp is associated with and stored with the current location of the refuse vehicle and the image captured by the imaging device at the current location of the refuse vehicle.

7. The refuse vehicle of claim 6, wherein a memory in communication with the processing unit is configured to receive and store the image captured by the imaging device, current location, and timestamp, and wherein the memory is externally accessible.

8. The refuse vehicle of claim 1, wherein after the imaging device captures an image of the indicator, the processing unit generates an alert and issues a notification to an account associated with a location where the imaging device captured the image of the indicator, the notification including at least one of the image of the indicator, a time in which the image of the indicator was captured by the imaging device, and the location where the imaging device captured the image of the indicator.

9. The refuse vehicle of claim 8, wherein the imaging device is a still frame camera or a video camera.

10. A method of controlling a refuse vehicle, comprising:
    sensing, with a sensor, objects within a sensor field of view to detect an indicator within the sensor field of view, the sensor being coupled to the refuse vehicle;

communicating information from the sensor, including the indicator sensed within the sensor field of view, to a processing unit in communication with the sensor; and capturing, with an imaging device, media of an imaging device field of view upon receiving confirmation that the indicator is located within the sensor field of view from the processing unit;

wherein the sensor field of view and the imaging device field of view at least partially overlap.

11. The method of claim 10, wherein the indicator located within the sensor field of view is a waste container.

12. The method of claim 10, further comprising a step of determining, from a coordinate monitoring system, a location of the refuse vehicle where the sensor detected the indicator within the sensor field of view.

13. The method of claim 12, further comprising a step of storing information, including the captured media of the imaging device field of view and the location of the refuse vehicle, on a memory in communication with the processing unit.

14. The method of claim 10, further comprising sending a notification to a customer associated with a location of the refuse vehicle where the sensor detected the indicator within the sensor field of view.

15. The method of claim 10, wherein the sensor repeats the step of sensing objects within the sensor field of view to detect the indicator within the sensor field of view each time a coordinate monitoring system determines that a current location of the refuse vehicle, as determined by a global positioning system, corresponds to a known customer address.

16. The method of claim 10, wherein the sensor is coupled to the refuse vehicle proximate a lifting system of the refuse vehicle.

17. A refuse vehicle, comprising:
a chassis supporting a plurality of wheels;
a vehicle body supported by the chassis and defining a receptacle for storing refuse therein;
a lifting system movable between a first position and a second position vertically offset from the first position;
a processing unit;
a global positioning system in communication with the processing unit;
a clock in communication with the processing unit; and
an imaging device in communication with the processing unit and positioned on the refuse vehicle to have a field of view extending outwardly away from the refuse vehicle, the processing unit controlling the imaging device to capture media upon receiving a prompt that an indicator external to the refuse vehicle is present within the field of view and directing a memory to store the captured media with a current refuse vehicle location generated by the global positioning system and a timestamp generated by the clock.

18. The refuse vehicle of claim 17, wherein the prompt that an indicator is present within the field of view is provided by an operator positioned within the refuse vehicle.

19. The refuse vehicle of claim 17, wherein the prompt that an indicator is present within the field of view is generated by the processing unit upon receiving a signal from a sensor coupled to the vehicle body that the indicator is present within the field of view.

20. The refuse vehicle of claim 17, wherein the clock measures an amount of time elapsed at the current refuse vehicle location and stores the amount of time elapsed at the current refuse vehicle location within the memory.

* * * * *